United States Patent [19]
Page et al.

[11] Patent Number: 5,487,480
[45] Date of Patent: Jan. 30, 1996

[54] HYDRO-PNEUMATIC CUSHIONING DEVICE

[75] Inventors: Ronald C. Page, Coventry; John J. Bushnell, Leamington Spa; Terence D. Williams, Coventry, all of United Kingdom

[73] Assignee: Oleo International Holdings Limited, Coventry, United Kingdom

[21] Appl. No.: 257,704

[22] Filed: Jun. 10, 1994

[30] Foreign Application Priority Data

Jun. 10, 1993 [GB] United Kingdom ............... 9311999

[51] Int. Cl.$^6$ .................................................. B61G 9/00
[52] U.S. Cl. ........................................ 213/43; 188/287
[58] Field of Search ............................ 213/7, 43, 223; 267/119, 124, 217; 188/269, 281, 287, 313, 315, 286, 284, 285

[56] References Cited

U.S. PATENT DOCUMENTS

| | | | |
|---|---|---|---|
| 1,534,059 | 4/1925 | Dennett | 188/287 |
| 1,935,741 | 11/1933 | Gunn | 188/285 |
| 2,011,460 | 8/1935 | Snyder | 188/285 |
| 3,584,331 | 6/1971 | Hooge | 16/82 |
| 3,589,528 | 6/1971 | Stephenson | 213/43 |
| 3,791,534 | 2/1974 | Stephenson | 213/43 |
| 3,854,596 | 12/1974 | Stephenson et al. | 213/8 |
| 3,864,922 | 2/1975 | Dial et al. | 213/43 |
| 4,838,392 | 6/1989 | Miller et al. | 188/286 |
| 5,025,938 | 6/1991 | Bomgardner et al. | 213/43 |

FOREIGN PATENT DOCUMENTS 5248777  4/1977  Japan ................................ 188/285

Primary Examiner—Robert J. Oberleitner
Assistant Examiner—S. Joseph Morano
Attorney, Agent, or Firm—Birch, Stewart, Kolasch & Birch

[57] ABSTRACT

An end-of-car coupler includes a hydro-pneumatic cushioning device. The latter has a ported tube separating the hydraulic cylinder chamber from an outer annular chamber containing gas. Each port is fitted with a valve, the obturating member of each valve being a differential area piston. The valves are all closed until subjected to a certain threshold force by movement of the plunger in the cylinder when all those valves between the plunger and the end of the cylinder chamber open to allow liquid flow between the two chambers.

6 Claims, 4 Drawing Sheets

HYDRO-PNEUMATIC CUSHIONING DEVICE

BACKGROUND OF THE INVENTION

This invention relates to a hydro-pneumatic cushioning device for use in an energy absorbing device such as an end-of-car coupler for a railway vehicle, the cushioning device comprising a structure forming a closed ended cylinder chamber and an annular chamber which surrounds the cylinder chamber, there being metering holes in the structure which provide metered communication between the chambers, each metering hole being spaced from the other metering holes in a direction which is parallel to the axis of the cylinder chamber, and a plunger which is slidable within the cylinder chamber, the latter chamber being filled with liquid and there being a volume of gas within the annular chamber when the device is used, the gas acting through the liquid to urge the plunger towards one end of the cylinder chamber when the device is not loaded. Such a device is referred to as "a hydro-pneumatic device of the kind referred to" in the rest of this description.

DESCRIPTION OF RELATED ART

U.S. Pat. Nos. 3,589,528 (Stephenson), 3,791,534 (Stephenson) and 3,854,596 (Stephenson et al) each disclose an end-of-car coupler for a railway vehicle which incorporates a hydro-pneumatic device of the kind referred to above. In the buff position of the plunger, some of the metering holes are covered. Each of these metering holes is individually controlled by a control valve whilst the other metering holes are open and unvalved. The control valves include a differential area piston which is biased radially inwardly by the pressure within the cylinder chamber when that pressure is high and which is biased outwardly by low pressure within the cylinder chamber. Inward biasing of the differential area piston closes the control valve. There is a disabling device which prevents closure of the control valve when the plunger is subjected to impact forces of the type encountered during coupling. These control valves permit flow of liquid from the cylinder chamber with a first impedance in response to coupling force induced by relative movement of the plunger within the cylinder chamber and with a second, greater impedance in response to "run-in" action force induced relative movement of the plunger within the cylinder chamber. There is another, spring-loaded valve which is normally open to provide communication between the cylinder chamber and the annular chamber and which is induced by a pressure differential to move radially outwardly to close that communication in response to "run-out" train action phenomena thereby providing a control of draft extension during "run-out".

U.S. Pat. No. 1,534,059 (Dennett) discloses the provision of spring loaded ball valves controlling outflow of liquid from a cylinder chamber. The spring loads on the balls are different one from another so that, as a piston advances in the cylinder, it will encounter progressively greater resistance owing to the relative resiliency or lack of resiliency of the springs. U.S. Pat. No. 3,584,331 (D'Hooge) discloses the use of adjustable metering valves to control flow from either side of a double-acting piston to the other through the wall of the cylinder.

It has been realized that, at slow speeds, the metering holes do not offer sufficient resistance to the liquid to provide the degree of protection against shock loads required for goods (e.g. automobiles) loaded on the rail wagon.

SUMMARY OF THE INVENTION

According to this invention there is provided a hydro-pneumatic device of the kind referred to wherein a valve is fitted into each metering hole, each valve being operable to inhibit passage of liquid through the respective metering hole when a force which is less than a predetermined threshold force is applied to urge the plunger axially within the cylinder chamber and to open to allow displacement of liquid between the chambers when a force which is greater than the predetermined threshold force is applied to urge the plunger into the cylinder chamber.

Preferably each valve is designed so that the force exerted by the plunger to displace liquid from the cylinder chamber does not exceed a predetermined force which is higher than the predetermined threshold force.

In a preferred embodiment, each valve comprises an obturating member which is a differential area piston, the larger surface area of which is exposed to the compressed gas and the smaller diameter end portion of which is adapted to seat on the perimeter of the respective metering hole when the valve closes that metering hole.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A cushioning device in which this invention is embodied which is for fitting into a railway vehicle end of car coupler will be described now by way of example with reference to the accompanying drawings which are given by way of illustration only, and thus are not limitative of the present invention, and of which.

DESCRIPTION OF THE PREFERRED EMBODIMENTS

Figure 1:
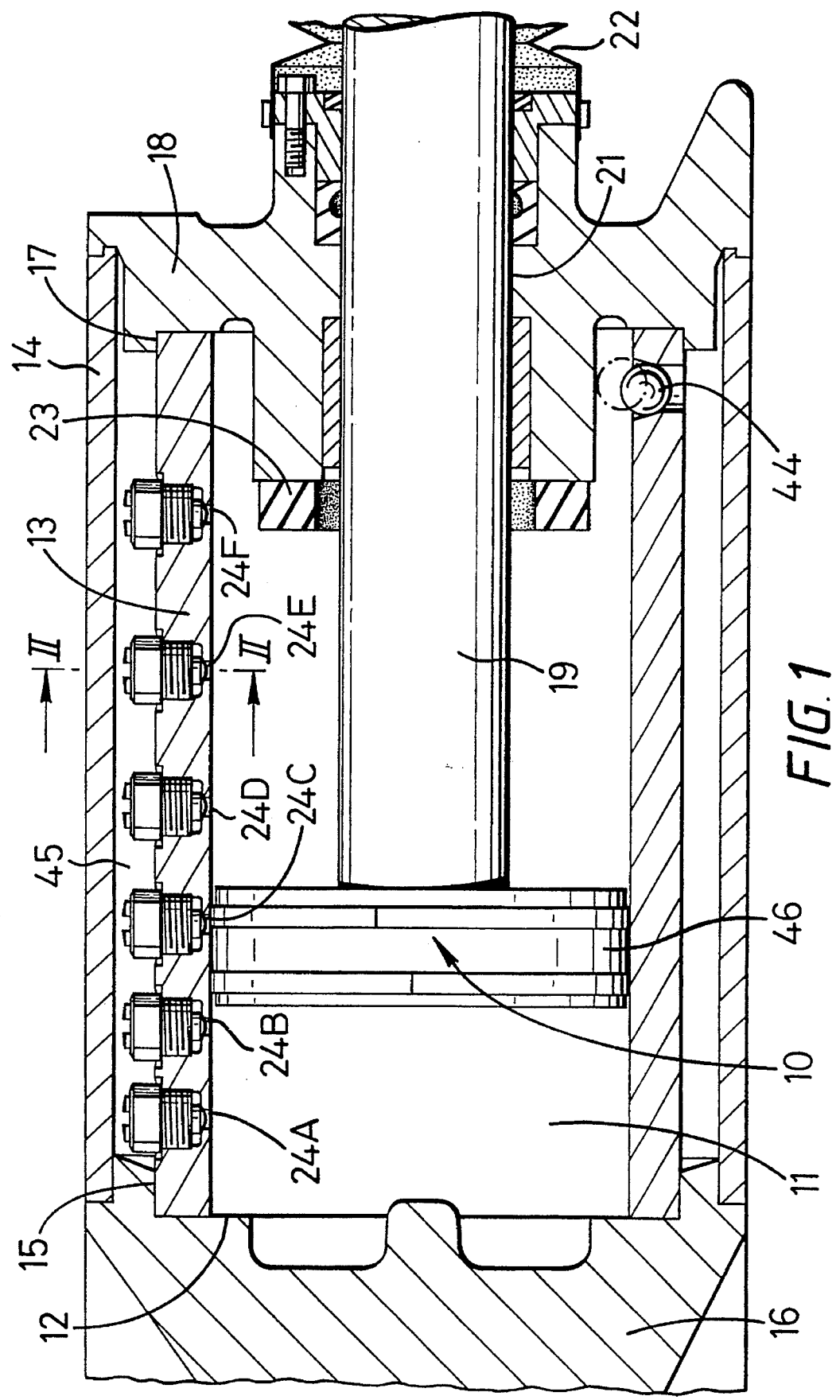
FIG. 1 is a fragmentary transverse section of the device.

FIG. 1 shows the cushioning device comprises a plunger 10 mounted in a cylinder 11 which is closed at one end 12. The cylinder 11 comprises a ported tube 13 which is coaxially surrounded by an outer tube 14. The ported tube 13 is spigotted into a circular recess 15 which is formed in a yoke member 16 which forms the closed end 12 of the cylinder chamber and which is for connecting to the hook portion of the coupler. The yoke member 16 in turn is spigotted into the outer tube 14. The other end of the ported tube 13 is spigotted into a circular recess 17 in an annular end member 18 which in turn is spigotted into the outer tube 14. The rod portion 19 of the plunger 10 is a sliding fit in the bore 21 of the annular member 18 to which it is connected by the usual flexible boot 22. The annular member 18 carries an annular buffer stop element 23 of elastomeric material within the cylinder chamber.

Figure 2:
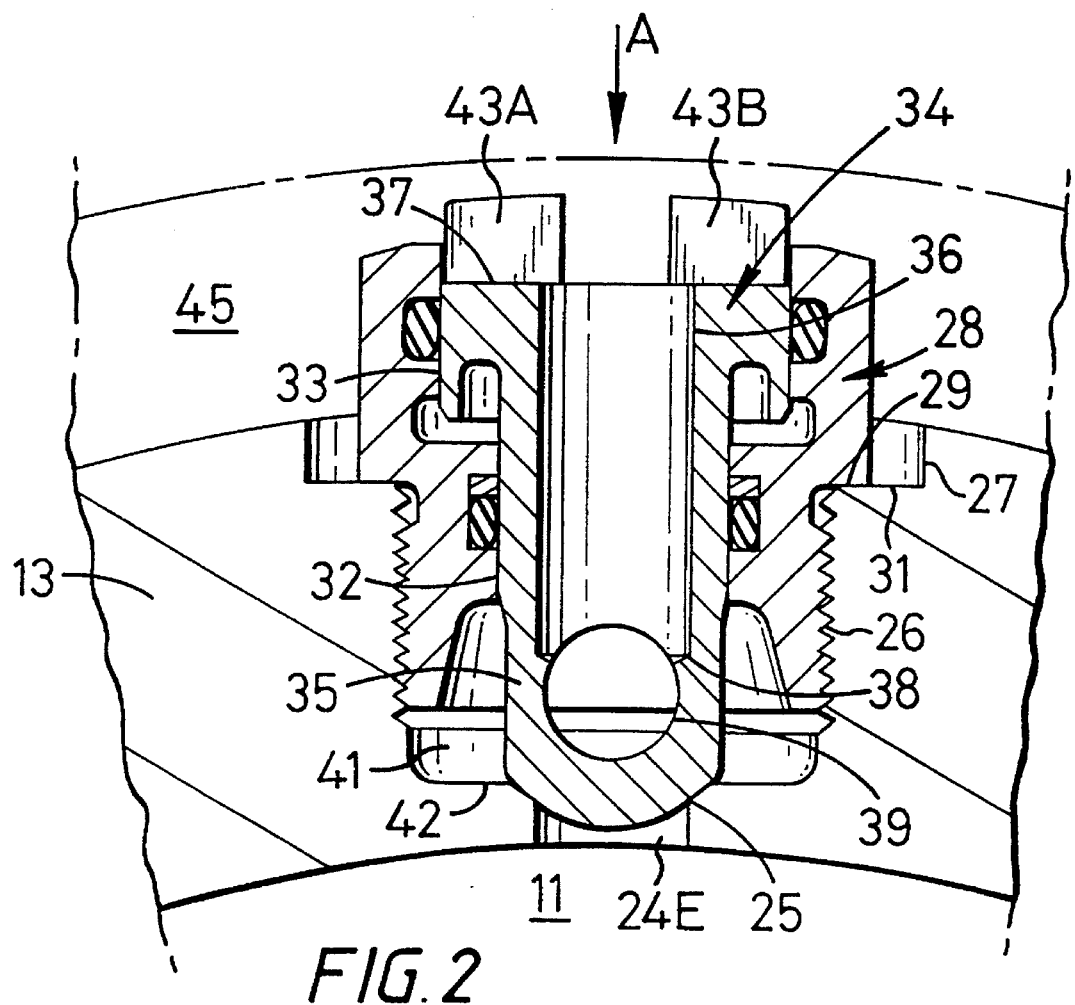
FIG. 2 is a transverse section on the line II—II of FIG. 1 of one form of a typical one of the valves in the ported tube of the device shown in FIG. 1.

Each port 24A–24F of the ported tube 13 comprises a metering hole. FIG. 2 shows it has an inner end bore portion 25 which forms an orifice, a tapped intermediate diameter portion 26 and a larger diameter outer end portion 27. An annular valve body 28, which has a stepped outer surface, is screwed into the intermediate diameter bore portion 26 so that its shoulder 29 seats on the shoulder 31 that is formed between the intermediate and outer diameter bore portions 26 and 27. The bore of the annular valve body 28 is stepped. The smaller diameter portion 32 of the stepped bore is the radially inner of the two bore portions 32 and 33 of that stepped bore.

A stepped piston 34 is a sliding fit in the stepped bore of the annular valve body 28 and its smaller diameter end 35 is adapted to seat in the orifice 25 so as to serve as an obturating member. An axial bore 36 in the stepped piston 34 opens at the larger diameter end 37 of the latter and is closed at its other end 38 but communicates via a lateral bore portion 39 with a chamber 41 which is formed between the valve body 28 and the step 42 between the orifice 25 and the intermediate diameter bore portion 26. The annular surface area of the larger diameter end 37 of the stepped piston 34 is several times larger than the cross sectional area of the orifice 25. Four equiangularly spaced projections 43A–43D from the larger diameter end 37 of the stepped piston 34 serve as stops which co-operate with the outer tube 14 to limit outwards movement of the stepped piston 34.

A non-return valve 44 in the ported tube 13 allows one way liquid flow from the annular chamber 45 that is formed between the ported tube 13 and the outer tube 14 into the cylinder chamber 11.

In operation, the annular chamber 45 contains compressed gas and the cylinder chamber 11 formed within the ported tube 13 contains hydraulic fluid. In the unloaded state of the device, the piston head portion 46 of plunger 10 is urged against the annular stop 23 and the stepped pistons 34 are seated by the action of the compressed gas in the annular chamber 45 so that the orifices 25 are closed.

When a force is imposed in buff on the coupler, the piston head portion 46 of the plunger 10 is urged away from the annular stop 23. Except when the device is in its unloaded state with the piston head portion 46 against the annular stop 23, imposition of a force on the coupler in draft urges the piston head portion 46 towards the buffer stop 23. Either way, the valves 24A–24F remain seated until the force reaches a certain predetermined level when all those valves between the plunger 10 and the end 12 of the cylinder chamber 11 will be unseated substantially simultaneously to open them so that hydraulic fluid is forced through the orifices 25, the chamber 41, the lateral bore portions 39 and the bores 36 in the stepped pistons 34 into the annular chamber 45 dissipating energy in so doing. The gas is compressed further by the liquid that is forced into the annular chamber 45 thereby providing a recoil force to force the hydraulic fluid back through the non-return valve 44 into the cylinder chamber 11 when the force imposed on the coupler is relieved.

Figure 4:
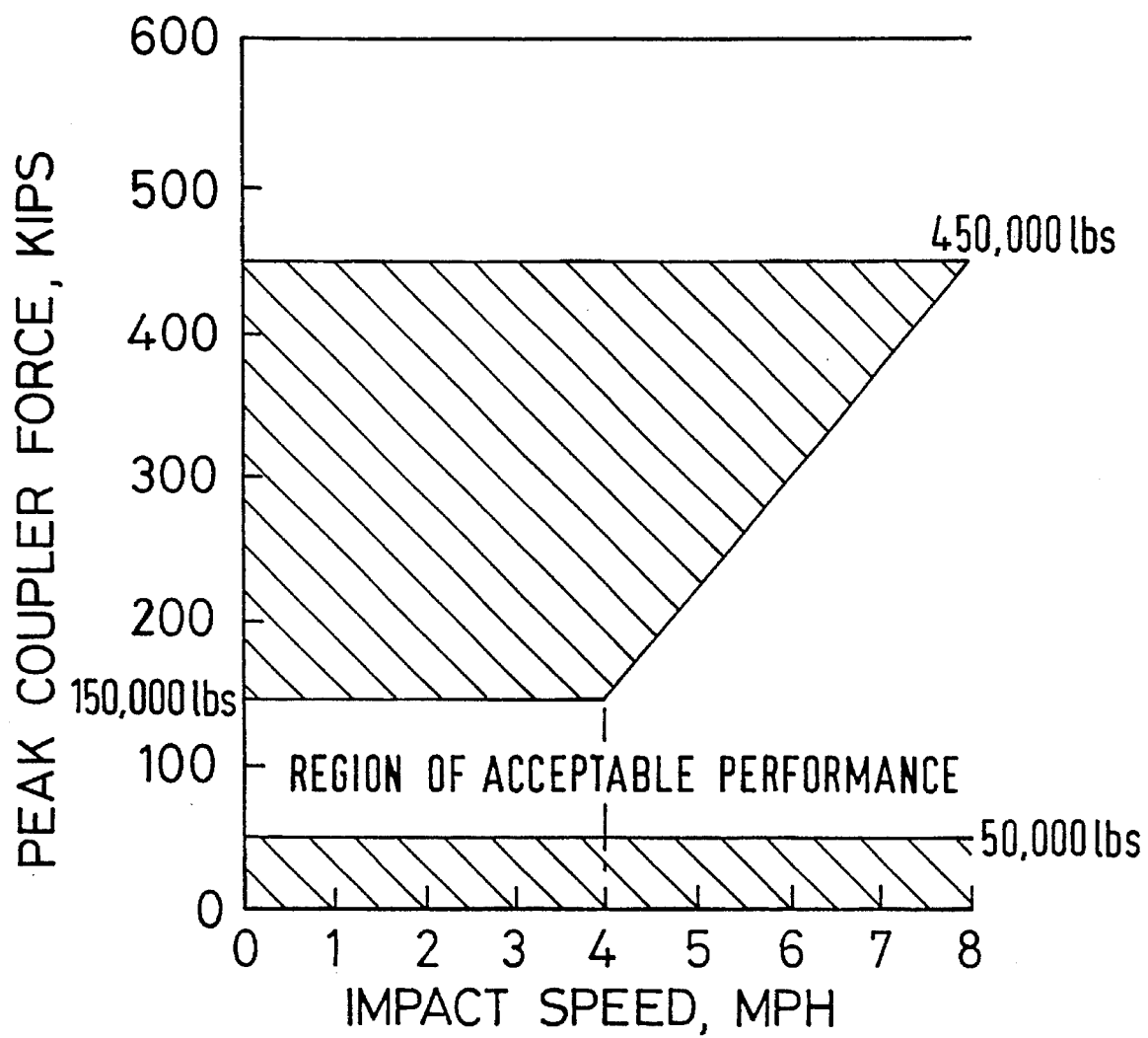
FIG. 4 is a diagram in graphical form illustrating the required performance envelope of an end-of-car coupler incorporating a cushioning device which incorporates this invention.

Metering ports 24A–24F are arranged in the ported tube 13 so that the peak coupler force relative to the railroad car on which the coupler is mounted does not exceed a certain maximum force at low speeds. FIG. 4 illustrates the designed performance envelope for an end-of-car coupler which incorporates a cushioning device in which this invention is embodied. For speeds up to 8 mph, the peak coupler force should not fall below 50,000 lbs. That is achieved by the action of the valves fitted into each of the metering holes 24A–24F, 50,000 lbs being the force required to unseat the differential area pistons 34. The arrangement of the metering holes 24A–24F is designed to limit the maximum peak coupler force relative to the railroad car to 150,000 lbs for speeds below 4 mph, and to a progressively increasing maximum which rises from 150,000 lbs to 450,000 at 8 mph. Hence, the unshaded area of the graph in FIG. 4 between the two shaded areas is the area of acceptable performance of the coupler.

Figure 3:
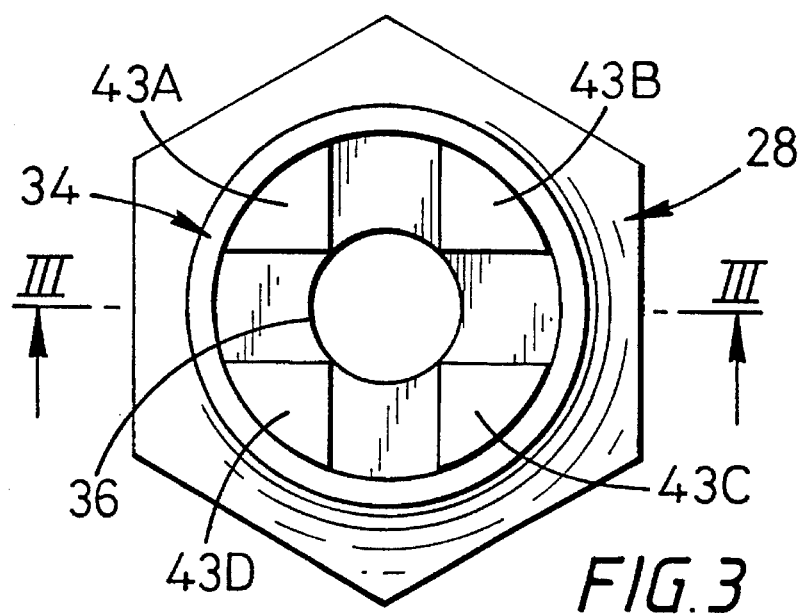
FIG. 3 is a view on arrow A of the valve shown in FIG. 2.
Figure 5:
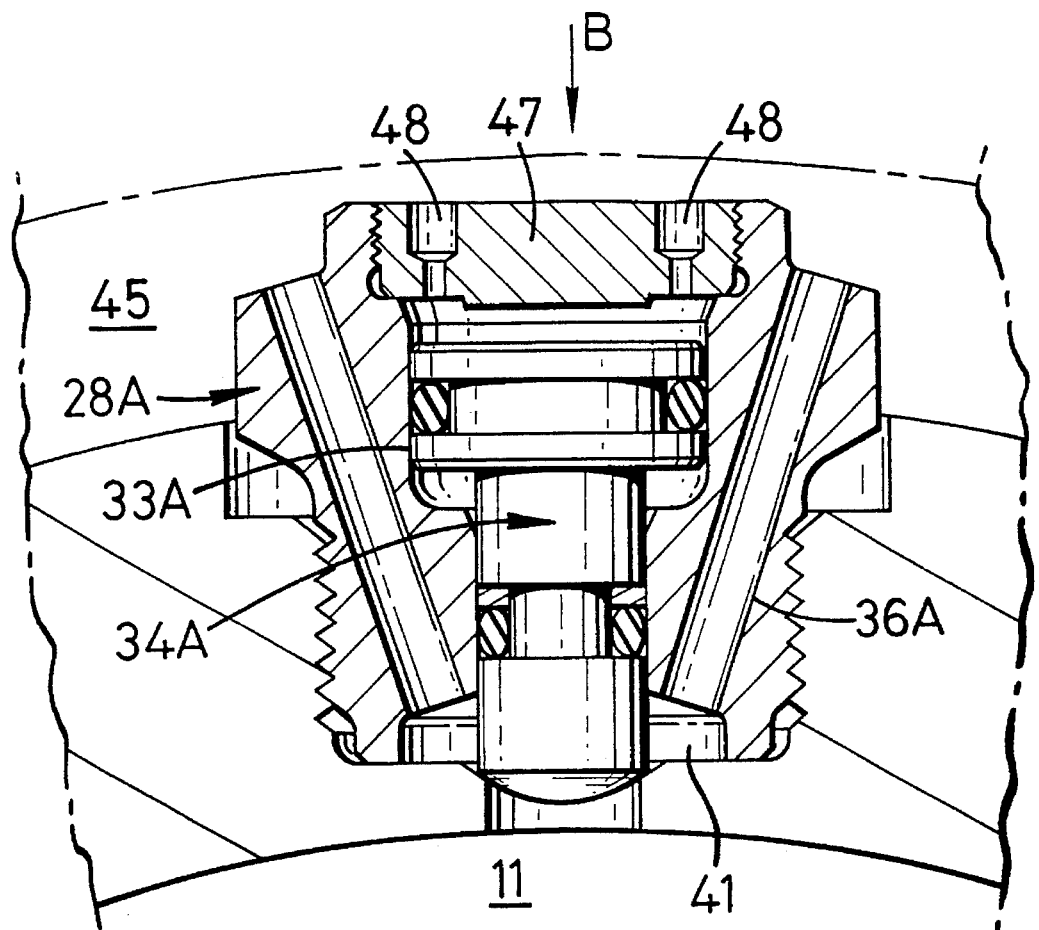
FIG. 5 is a view similar to FIG. 2 of another form of valve for use in the device shown in FIG. 1.
Figure 6:
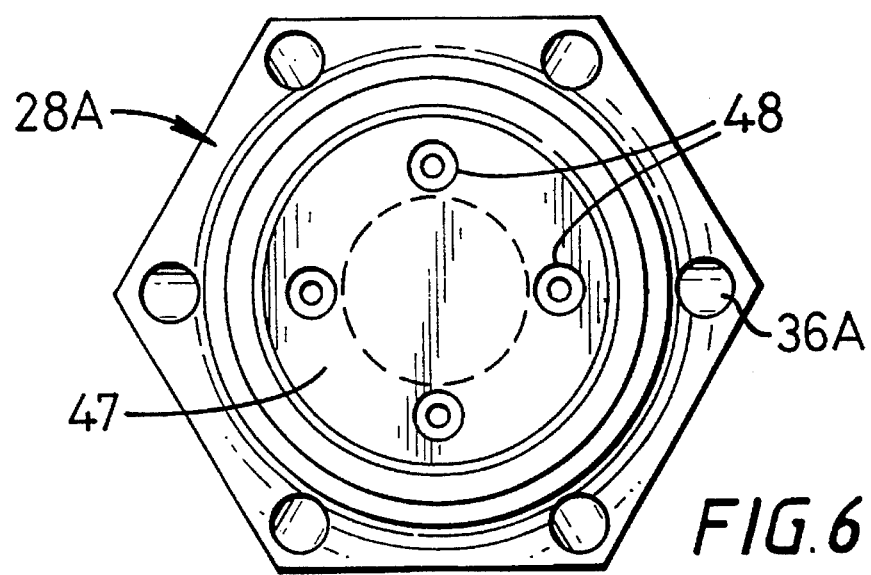
FIG. 6 is a view on arrow B of the valve shown in FIG. 5.

A disadvantage with the form of metering valve shown in FIGS. 2 and 3 is that the outer casing is relied upon as a stop for radially outwards movement of the stepped piston 34. The problem with that is that the outer casing 14 is dimensionally variable. To avoid this problem, a solid stepped piston 34A may be used, as is shown in FIGS. 5 and 6, the passages 36A for flow between the chamber 41 and the annular chamber 45 being formed in the valve body 28A rather than in the stepped piston 34A. The solid stepped piston 34A slides in the stepped through bore in the valve body 28A. The outer end of the larger diameter portion 33A is closed by an end plug 47. Damping holes 48 are provided in the end plug 47 to prevent damage to the stepped piston 34A and to avoid high peaks of flow through the valves 24A–24F.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A hydro-pneumatic cushioning device for use in an end-of-car coupler for a railway vehicle, the cushioning device comprising structure forming a cylinder chamber which has an axis and which is closed at a first end, and an annular chamber which surrounds the cylinder chamber, there being metering holes in the structure which provide metered communication between the chambers, each metering hole being spaced from the other metering holes in a direction which is parallel to the axis of the cylinder chamber, and a plunger which is slidable within the cylinder chamber and which has a rod portion which passes through a second end of the cylinder chamber in a fluid-tight manner, the cylinder chamber being filled with liquid and there being a volume of gas within the annular chamber when the device is used, the gas acting through the liquid to urge the plunger towards said second end of the cylinder chamber when the device is not loaded, wherein each of said metering holes has a respective valve fitted into it, each valve comprising a stepped piston which has two ends and an intermediate portion which is a sliding fit in a part of said structure between said cylinder chamber and said annular chamber, the diameter of the stepped piston being smaller at one of its ends than it is at the other of its ends, the smaller diameter end of the piston serving as an obturating member which is adapted to seat on a valve seat formed around the respective metering hole whereby to close that metering hole and the larger diameter end being exposed to pressure in said annular chamber which acts on the stepped piston to seat the smaller diameter end on said valve seat whereby passage of liquid through the respective metering hole is inhibited when a force which is less than a predetermined threshold force is applied to urge the plunger axially within the cylinder chamber, the valve being operable to be opened to allow displacement of liquid between the chambers when a force which is greater than the predetermined threshold force is applied to urge the plunger within the cylinder chamber, whereby there is no displacement of liquid from the cylinder chamber to the annular chamber when any force is applied to urge the plunger axially within the cylinder chamber is less than said predetermined threshold force and whereby all said valves between said plunger and the end of the cylinder chamber towards which it is urged open substantially simultaneously to allow displacement of liquid between the chambers through all the metering holes between the plunger and the end of the cylinder chamber towards which the plunger is urged when a force in excess of said predetermined threshold force is applied to the plunger.

2. The hydro-pneumatic cushioning device according to claim 1, wherein each valve is designed so that the force exerted by the plunger to displace liquid from the cylinder chamber does not exceed a predetermined force which is higher than the predetermined threshold force.

3. The hydro-pneumatic cushioning device according to claim 1, wherein the stepped piston of each valve has a fluid flow passage formed through it, said fluid flow passage communicating at the smaller diameter end with a chamber which communicates with the cylinder chamber when the valves are unseated.

4. The hydro-pneumatic cushioning device according to claim 3, wherein an angularly spaced array of projections from the larger diameter end of the stepped piston cooperate with the outer wall of the device as stops to limit radially outwards movement of the stepped piston.

5. The hydro-pneumatic cushioning device according to claim 1, wherein the cylinder chamber communicates with the annular chamber through at least one by-pass passage when the stepped piston is unseated from the respective valve seat.

6. The hydro-pneumatic cushioning device according to claim 5, wherein damping means are provided to damp movement of the stepped piston.

* * * * *